United States Patent [19]

Osawa et al.

[11] 3,863,220

[45] Jan. 28, 1975

[54] LOOP TYPE DATA HIGHWAY SYSTEM FOR DATA TRANSMISSION

[75] Inventors: Akira Osawa; Hajime Yasuda, both of Hitachi, Japan

[73] Assignee: Hitachi, Ltd., Tokyo, Japan

[22] Filed: Dec. 7, 1972

[21] Appl. No.: 312,973

[30] Foreign Application Priority Data

Dec. 10, 1971 Japan .............................. 46-100439

[52] U.S. Cl. .............................. 340/147 LP, 340/163

[51] Int. Cl. .............................. H04q 9/00

[58] Field of Search ...... 340/163 R, 147 LP, 147 R; 179/15 AL, 15 AT

[56] References Cited

UNITED STATES PATENTS 3,639,904 2/1972 Arulpragasam .............. 340/147 LP

*Primary Examiner*—Harold I. Pitts

*Attorney, Agent, or Firm*—Craig & Antonelli

[57] ABSTRACT

A loop type data highway system for data transmission in which a plurality of stations each including at least a series connection of a receiver, control gates and a transmitter are connected in series with one another by a single common bus to form a closed loop. Each of those stations comprises means for applying a request for occupying the common bus, means for confirming as to whether the common bus is idle and available, means for turning off the control gates thereby opening the loop after confirmation of the fact that the common bus is idle and available, means for delivering a priority code A peculiar to the specific station to the common bus through the transmitter, and means for comparing the priority code A with another priority code B received by the specific station for the purpose of determining the priority order. The specific station determines that it succeeds in occupying the common bus when $A = B$ and fails to occupy the common bus when $A \neq B$. The specific station determines that another station having a lower priority order than the specific station applies a request for occupying the common bus simultanaeously with the request from the specific station when $A > B$, and that another station having a higher priority order than the specific station applies a request for occupying the common bus simultaneously with the request from the specific station when $A < B$.

18 Claims, 4 Drawing Figures

Patented Jan. 28, 1975

3,863,220

3 Sheets-Sheet 2

LOOP TYPE DATA HIGHWAY SYSTEM FOR DATA TRANSMISSION

BACKGROUND OF THE INVENTION

1. Field of the Invention

This invention relates to a loop type data highway system in which various data-processing devices dispersedly distributed in a wide area are connected into a closed loop through a common bus and anyone of these apparatuses occupies the common bus at any desired time so as to transfer information in series in a time division mode.

2. Description of the Prior Art

Various data highway systems employing a common bus have heretofore been proposed and known in the art. The following three systems are typical of the known systems of this kind:

a. One of them is a data highway system commonly called a tree type, In this system, common hardware for synchronous operation (hereinafter called a master station) includes a clock generator connected to a common bus which has a plurality of branches and is of the synchronous type.

b. Another is a data highway system having a common bus in the form of a loop. In this system, data transfer is synchronously controlled by a master station, and priority control is done by utilizing time slots preliminarily allotted to the stations.

c. Another is a data highway system arranged in the form of a loop. In this system, no master station is fixed but the stations connected in the loop, are assigned by turns to a master station.

The prior art data highway system described in (a) has the following defects:

1. It is difficult to check transmitted data since the system is not arranged in the form of a loop.
2. Breakdown of the master station leads to shutdown of the entire system.
3. Independent common buses are required for the data transmission and synchronization, resulting in the increase in the costs of cables and wiring work.

The prior art data highway system described in (b) has the following defects:

1. Breakdown of the master station leads to shutdown of the entire system.
2. Two or more common buses are required for the synchronizing signal and data transmission.
3. Priority control is carried out to deal with the case in which requests for occupying the common bus appear simultaneously. Difficulty is encountered with noises that may appear during the priority control. According to this system, time slots are allotted by the master station to a plurality of stations and a signal of 1 is transmitted from a specific station which requests the occupation of the common bus on the time slot allotted thereto when it occurs. This system is therefore susceptible to noises since the time slot allotted to each station permits only one bit for the purpose and has no margin for redundancy.
4. The time slots must have a length corresponding at least to the number of stations. Thus, the time slots occupy a long period of time resulting in poor transmission efficiency when the number of stations is large.
5. The necessary number of addresses is increased especially when a variable priority order is desired, since this is equivalent to the addition of imaginary stations. Thus, with the time slot system, the transmission efficiency is lowered for the reason described in (4).

The prior art data highway system described in (c) has the following defects:

1. Any station cannot transmit data until it is assigned to operate as the master station.
2. Breakdown of a station operating as the master station results in impossibility of subsequent data transmission. Accordingly, the entire system is rendered inoperative, and the reliability of the system is lowered.
3. Special hardware is required for successively shifting the position of the master station. Thus, the system becomes correspondingly complex and expensive.

SUMMARY OF THE INVENTION

It is an object of the present invention to provide a novel and improved data highway system for data transmission comprising a plurality of stations connected by a common bus to form a closed loop in which anyone of these stations can transmit data to another station with any desired timing when the common bus is idle and available.

Another object of the present invention ia to provide a data highway system utilizing only one common bus without any additional transmission line for the priority control.

A further object of the present invention is to provide a data system in which any additional hardware for the priority control need not be provided in the closed loop.

Still another object of the present invention is to provide a data highway system which is free from shutdown of the entire system even when breakdown occurs in anyone of the stations connected in the closed loop through the common bus.

Yet another object of the present invention is to provide a data highway system which is readily expandable for additional installation of stations.

A further object of the present invention is to provide a data highway system in which the priorty order can be varied as desired.

One of the features of the present invention resides in the fact that a plurality of stations each including at least a combination of a receiver, control gates and a transmitter connectd in series are connected in series through a single common bus to form a closed loop.

Another feature of the present invention resides in the fact that each of the stations forming the closed loop monitors continuously as to whether the common bus is idle and available, and when a request for occupying the common bus appears from one of the stations in the idle and available state of the common bus, the control gates are turned off to open the loop and a priorty code peculiar to the specific station is transmitted to the common bus after transmission of a synchronizing signal.

Another feature of the present invention resides in the fact that upon comparing the transmitted priority code *A* peculiar to the transmitting station with a priority code *B* received subsequently by the station, the coincidence between the transmitted and received priority codes A and B indicates that the common bus is now idle and available for the station to transmit data.

Another feature of the present invention resides in the fact that, when the result of comparison between the transmitted priority code $A$ and the received priority code $B$ gives the relation $A > B$, the specific station delivers the same priority code $A$ again, while when the result of comparison gives the relation $A < B$, the specific station determines that another station having a higher priority order than the specific station applies a request for occupying the common bus simultaneously with the request from the specific station and acts to turn on the control gates thereby closing the loop.

Another feature of the present invention resides in the fact that three kinds of signals, that is, data signals 1 and 0 and a signal V indicating the absence of any data are employed for the data transmission and priority control.

Another feature of the present invention resides in the fact that, when the result of comparison between the priority codes A and B gives the relation $A > B$ and when errors are found in received data, the signal V appears and lasts for less than a predetermined period of time for initializing the remaining stations.

Another feature of the present invention resides in the fact that, upon success or completion of data transfer, the signal V appears and lasts for more than the predetermined period of time to tell the stations the fact that the common bus is now idle and available.

Another feature of the present invention resides in the fact that, in response to the detection of the signal V which lasts for less than the predetermined period of time, each station initializes flip-flops and counters of its own so that it is ready for reception of data again, and in response to the detection of the signal V which lasts for more than the predetermined period of time, each station is informed of the fact that the common bus is now idle and available.

Another feature of the present invention resides in the fact that each station is provided with an abnormal detector and a bypass route so that a faulty station can be disconnected from the common bus in the event of occurrence of abnormal condition such as breakdown of the power supply. Transmitter and receiver and data can be transferred through the bypass route thereby preventing undesirable shutdown of the entire system.

DESCRIPTION OF THE PREFERRED EMBODIMENT

Figure 1:
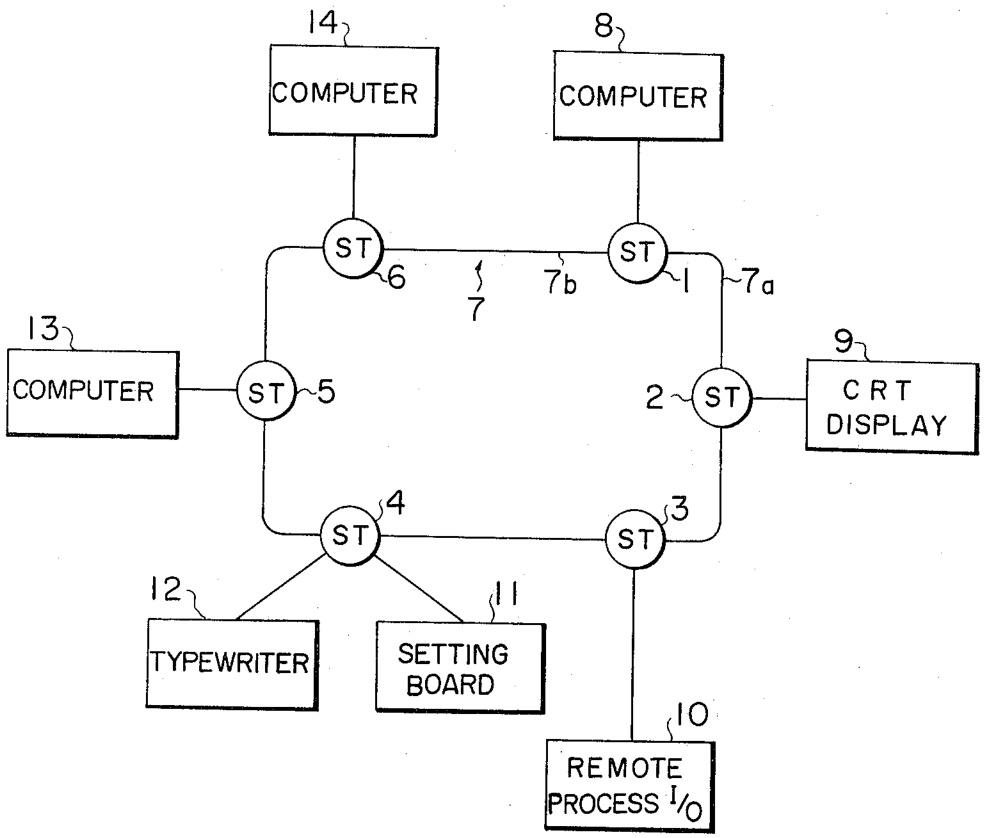
FIG. 1 is a diagram showing one form of the basis arrangement of a loop type data highway system according to the present invention.

Referring to FIG. 1 showing one form of the basic arrangement of a loop type data highway system embodying the present invention, a plurality of stations 1 to 6 form a closed loop by being connected with one another by a common bus 7. A computer 8 is connected to the station 1, and a cathode-ray tube display 9 is connected to the station 2. A remote processing input-output unit 10 is connected to the station 3, and a setting board 11 and a typewriter 12 are connected to the station 4. Computers 13 and 14 are connected to the stations 5 and 6 respectively. These various data processing devices are interconnected through the stations 1 to 6 so that transfer of information can be carried out between any desired two points on the loop.

Figure 2:
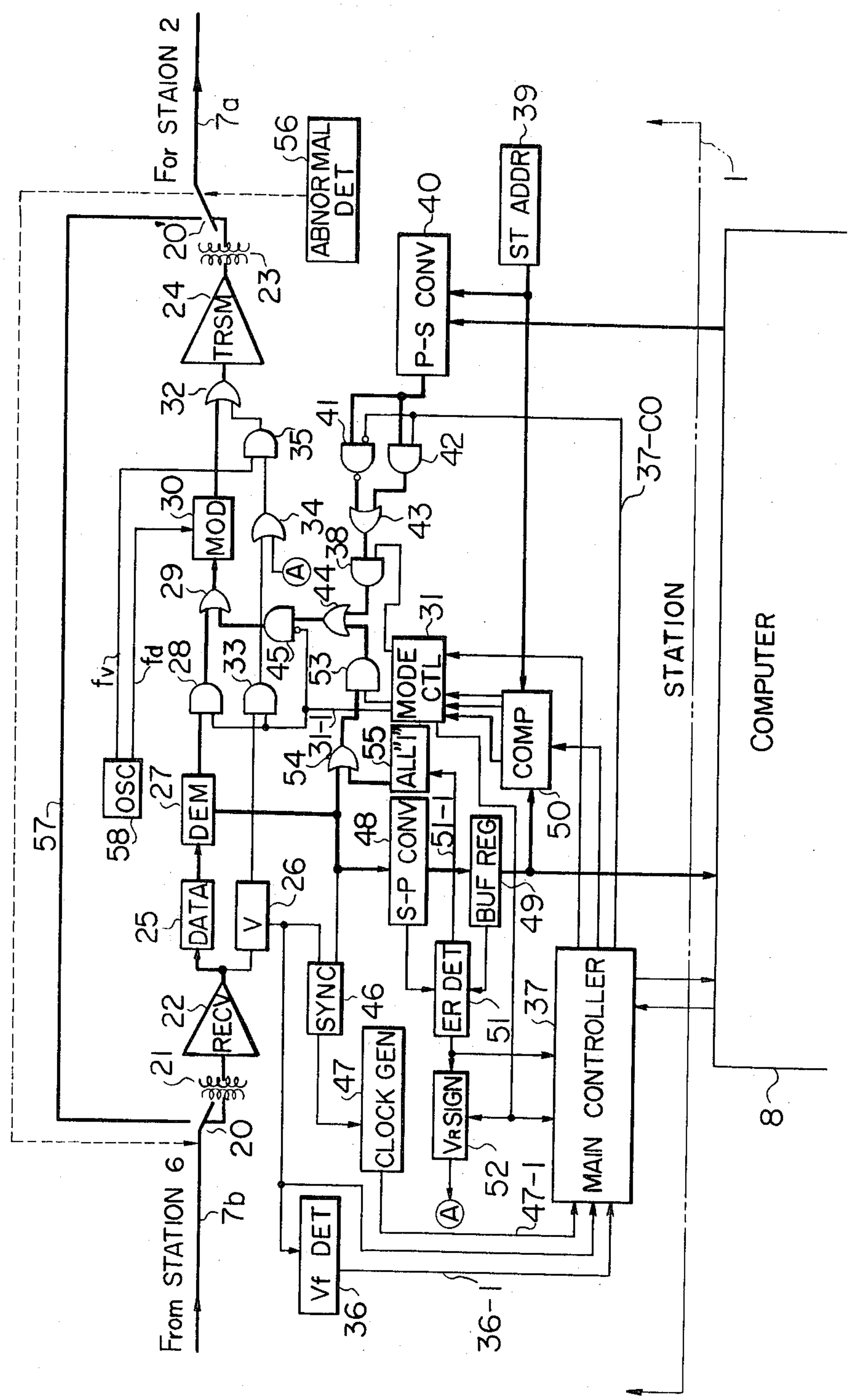
FIG. 2 is a connection diagram of one of a plurality of stations in the loop type data highway system shown in FIG. 1.

Referring to FIG. 2 showing the structure of the station 1 by way of example, an oscillator 58 is adapted to generate two kinds of carrier frequencies $f_D$ and $f_V$. The frequency $f_D$ is utilized to provide data signals 1 and 0, while the frequency $f_V$ is utilized for a signal which indicates the absence of such data signals. The data signals 1 and 0 are distinguished by phase modulation of the frequency $f_D$. The signal having the frequency $f_V$ (hereinafter referred to as a signal V) is classified into the following two signals depending on its duration:

1. $V_f$ (lasting for more than a predetermined period of time $T_f$)

This signal is used to inform each station of the fact that the common bus 7 is available. In other words, each station is informed of the fact that the common bus 7 is idle and available upon detecting the fact that the signal V lasting for more than a predetermined period of time $T_f$ is applied thereto. When a request for transmission of information is issued from one of the devices, for example, a computer connected to one of the stations 1, 5 and 6, the one station can immediately apply such a request to the common bus 7 so long as the common bus 7 is idle and available.

2. $V_R$ (lasting for less than the predetermined period of time $T_f$)

This signal has the same frequency as the signal $V_f$, but its duration $T_R$ is less than $T_f$, or $T_R < T_f$. This signal is used to initialize all the stations without releasing the common bus 7 when one of the stations having occupied the common bus 7 detects errors in the data being transmitted or when the relation $A > B$ is given as a result of comparison between the priority codes $A$ and $B$ described later in detail. The remaining stations cannot apply a request for data transfer even with detection of the signal $V_R$ and such a request is kept pending until the signal $V_f$ is detected subsequently.

Figure 4:
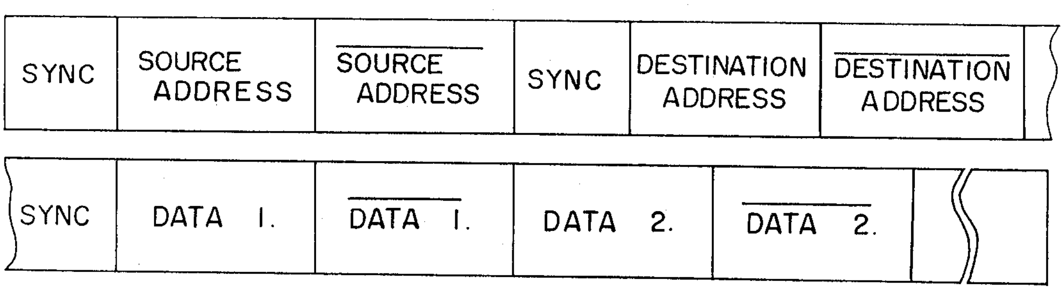
FIG. 4 shows a transmission format employed in the present invention.

FIG. 4, shows a transmission format preferably employed in the present invention. For the limited space of the sheet, the format is shown as divided in half, but really the left end of the upper half is continued to the right end of the lower half. Referring to FIG. 4, the train comprises a synchronizing signal portion SYNC, a source address, a complement of the source address, a synchronizing signal portion, a destination address, a complement of the destination address, a synchronizing signal portion, a first data, a complement of the first data, a second data, a complement of the second data, and so on as seen. The bar shown on a code label indicates the fact that it is a complement of the code designated by the label.

Referring to FIG. 2 again, a portion 7b of the common bus 7 connecting between the stations 6 and 1 is connected to a station bypass switch 20, while a portion 7a of the common bus 7 connecting between the stations 2 and 1 is connected to another station bypass switch 20'. The station bypass switch 20 is connected to a receiver 22 through an insulating transformer 21, while the station bypass switch 20' is connected to a transmitter 24 through an insulating transformer 23. The output of the receiver 22 is applied to a data signal discriminator 25 and to a V-signal discriminator 26. The output of the data signal discriminator 25 is applied to a demodulator 27 to be converted into logic levels of 1 and 0.

The output of the demodulator 27 is applied to a modulator 30 through an AND gate 28 and an OR gate 29. When a mode controller 31 is delivering an output 31-1 corresponding to a non-active mode, the AND gate 28 is in the on state, and the data input converted into the logic levels by the demodulator 27 is applied through the AND gate 28 and OR gate 29 to the modulator 30 in which the carrier frequency $f_D$ is subjected to phase modulation by the data signal. The output of the modulator 30 is applied to the transmitter 24 through an OR gate 32 to be sent out to the portion 7*a* of the common bus 7 through the insulating transformer 23 and station bypass switch 20′. The output of the V-signal discriminator 26 is applied to the transmitter 24 through an AND gate 33, an OR gate 34, an AND gate 35 and the OR gate 32. When the station 1 is in the non-active mode the signal V is converted into the logic level once and is sent out to the portion 7*a* of the common bus 7 due to the fact that the carrier frequency $f_V$ is applied to the AND gate 35 and the output 31-1 of the mode controller 31 is applied to the AND gate 33. It will thus be seen that, when the station 1 is in the non-active mode, the data input and signal V applied from the station 6 by way of the common bus 7 are demodulated once and are then modulated again to be sent out to the next station.

Figure 3:
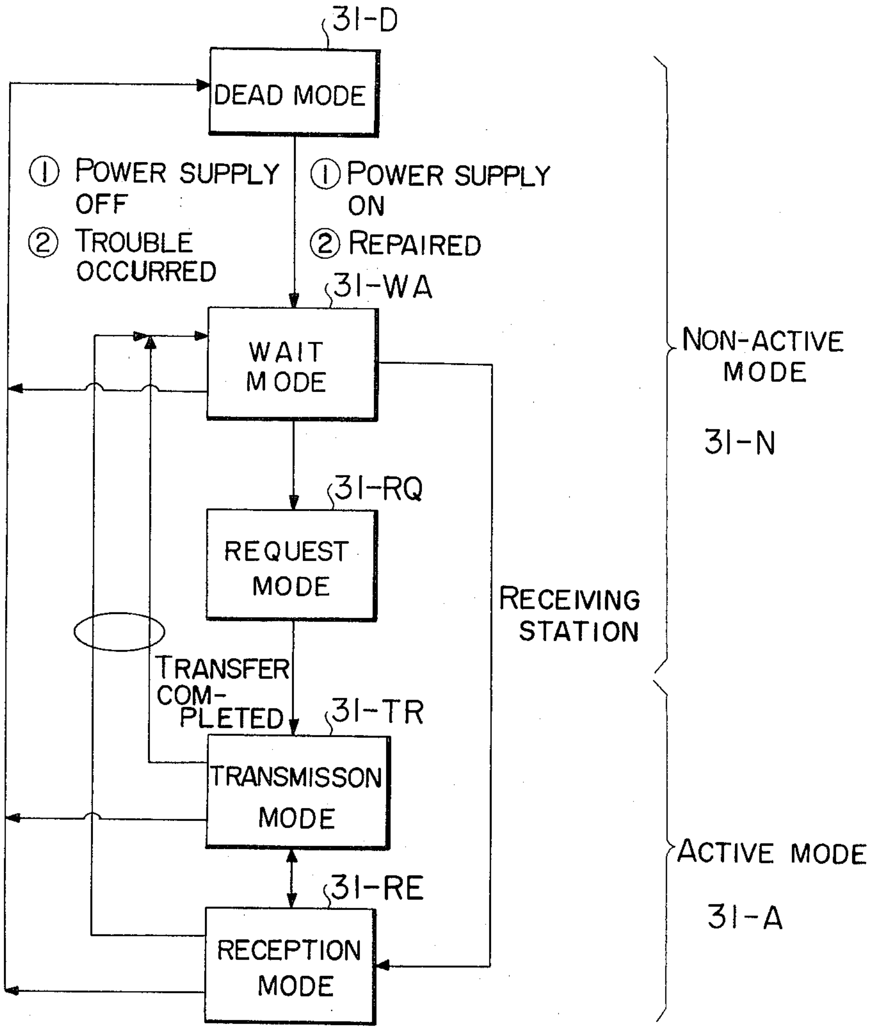
FIG. 3 shows the manner of mode transfer in the station shown in FIG. 2.

The mode controller 31 determines the operation mode of the station. FIG. 3 shows one form of the mode transfer in the station. The operation mode of the station is broadly classified into an active mode 31-A and a non-active mode 31-N. In the active mode 31-A, data are transferred through the station and this active mode 31-A is further classified into a tranmission mode 31-TR and a reception mode 31-RE. In the non-active mode 31-N, the station does not transfer any data. The non-active mode 31-N is further classified into a dead mode 31-D in which the station is in the non-operative state due to, for example, power supply interruption, a wait mode 31-WA in which the station is waiting for a request for data transfer and for reception, and a request mode 31-RQ in which the shift to the active mode cannot take place due to the fact that the common bus 7 is busy although a request for data transfer has occurred in the station.

The transmission mode 31-TR and reception mode 31-RE are shifted to the wait mode 31-WA when the data transfer has been successfully carried out, that is, when the data have been properly transferred. On the other hand, these modes 31-TR and 31-RE are shifted to the dead mode 31-D in the event of power supply breakdown or occurrence of failure. The dead mode 31-D is shifted to the wait mode 31-WA upon turn-on of the power supply again or completion of repairs on the faulty portion. The wait mode 31-WA is shifted to the reception mode 31-RE when the specific station is designated as a receiving station. The wait mode 31-WA is shifted to the request mode 31-RQ upon occurrence of a request for data transfer, and the transmission mode 31-TR is estabilished when the common bus 7 is successfully occupied by the specific station.

Suppose now that a request for data transmission is applied to the station 1 from the computer 8. An "idle" detector 36 monitors continuously the output of the V-signal discriminator 26. When the signal V does not last for more than the predetermined period of time $T_f$, the common bus 7 is considered to be busy and the station 1 stands by in the request mode 31-RQ. Since the station 1 is in the non-active mode 31-N in this case, the AND gate 28 is in the on state as described previously and the data being transferred between the other stations pass freely through the station 1. When, on the other hand, the "idle" detector 36 detects the fact that the signal V lasts for more than the predetermined period of time $T_f$, that is, when the "idle" detector 36 detects the signal $V_f$, this means that the common bus 7 is idle and available and the "idle" detector 36 delivers an output 36-1 to inform a main controller 37 of the fact that the common bus 7 is now idle and available. In response to the application of the input from the "idle" detector 36, the main controller 37 approves the request by the computer 8, and at the same time, applies a service request 37-RQ to the mode controller 31 thereby placing the station 1 in the transmission mode 31-TR. In the transmission mode 31-TR, the output indicative of the non-active mode 31-N is delivered from the mode controller 31 and the AND gates 28 and 33 are turned off. An AND gate 38 is turned on in the transmission mode 31-TR, and code representative of the station 1, that is, a source address is applied from an address setting means 39 to be put out on the portion 7*a* of the common bus 7 after a synchronizing signal portion as seen in FIG. 4. This source address identifies the address of the originating station 1 against the station to which data should be transferred and represents also a priority code of the station 1 requesting the occupation of the common bus 7. The source address is sent out from the address setting means 39 to the portion 7*a* of the common bus 7 through a parallel-serial converter 40, an inhibit gate 41, an AND gate 42, an OR gate 43, the AND gate 38, an OR gate 44, an inhibit gate 45, the OR gate 29, the modulator 30, the OR gate 32 and the transmitter 24. The inhibit gate 41, AND gate 42 and OR gate 43 are provided for transmitting the output of the parallel-serial converter 40 and succeedingly a complement thereof in response to a control signal 37-CO applied from the main controller 37 so that the source address can be transmitted serially in the form of normal and complementary codes as shown in FIG. 4. In at least one round period of time required for data to be transmitted through the data highway system after the transmission of the source address, data start to appear from the receiver 22 instead the signal $V_f$ which indicates the fact that the common bus 7 is idle and available. A synchronizing detector 46 is actuated in response to a first data 1 in the received data and triggers a clock pulse generator 47 for receiving the subsequent data. The clock pulse generator 47 applies clock pulses 47-1 to the main controller 37 so that the received data can be taken in according to a predetermined data format as shown in FIG. 4. The output of the receiver 22 is passed through the data discriminator 25 and demodulator 27 to be converted into the logic level and is stored in a buffer register 49 after being converted into a parallel signal by a serial-parallel converter 48. The first portion of the data stored in the buffer register 49 is the source address which represents also the priority code. The priority code stored in the buffer register 49 is compared in a comparator 50 with the output of the address setting means 39 belonging to the station 1 for the purpose of determining the priority order.

Suppose now that A and B are the priority code sent out from the station 1 and the priority code received by the station 1 respectively and are binary numbers. Then, there are three cases of $A = B$, $A > B$ and $A < B$, and a priority order determining step is taken in each of these cases. However, before this priority order determining step is taken, the received data are subjected to a complementary coincidence check, i.e., a coincidence check between a code and a complement of the complement of the code, and parity check by an error detector 51 so as to ensure freedom from errors. When errors are detected, the priority order determining step is not taken and the source address is sent out again from the address setting means 39 of the station 1 after a $V_R$ generator 52 delivers a signal $V_R$ for initializing all of the remaining stations. The signal $V_R$ has a frequency equal to the carrier frequency $f_V$ and appears only for a period of time $T_R$ which is too short to energize the $V_f$ detector 36. In other words, the relation $T_R << T_f$ holds where $T_f$ is the period of time required for the detection of the signal $V_f$.

The priority order is determined in a manner as described below. The relation $A = B$ indicates the fact that the remaining stations are not transmitting any data and the source address A sent out from the station returns to the station 1 as the priority code B. This means that the station 1 succeeds in occupying the common bus 7.

The relation $A > B$ indicates the fact that the station 1 fails to occupy the common bus 7 due to the fact that a request for occupation of the common bus 7 is applied from another station having a priority order lower than that of the station 1 simultaneously with the request from the station 1. In such a case, the signal $V_R$ is generated as when errors are detected, and retrial is started. The signal $V_R$ is generated prior to the starting of retrial so as to initialize the stations on the data highway. In response to the reception of the signal $V_R$, the V-signal discriminator 26 in each station delivers an output for resetting flip-flops and counters (not shown) thereby initializing the station. These flip-flops and counters in each station are also cleared in response to the reception of the signal $V_f$. Further, each station concludes that the common bus 7 is idle and available when the signal $V_f$ is detected, but it does not conclude that the common bus 7 is idle and available when the signal $V_R$ is detected. Thus, the specific station occupying the common bus 7 remains in the bus occupying position.

The relation $A < B$ indicates the fact that a request for occupation of the common bus 7 appears from another station, whose priority order is higher than that of the station 1, in simultaneous relation with the request from the station 1. In such a case, the transmission of data demanded by the computer 8 is not permitted until the highway becomes idle and available, and the request for data transfer by the computer 8 is kept pending temporarily. The station 1 is placed in the non-active mode 31-N and the input thereto is passed through the AND gates 28 and 33 to be sent out to the common bus 7 from the transmitter 24 so as to ensure the feature of the closed loop formed by the common bus 7.

The station 1, which succeeds in occupying the common bus 7 due to the fact that the priority order determination gives the relation $A = B$, transmits a synchronizing signal again and then transmits a destination address, an inverted destination address, a synchronizing signal, control data, data words, etc. The thick solid lines in FIG. 2 show the data signal flowing routes.

Due to the loop form of the common bus 7, all the data transmitted from the station 1 are necessarily received by the receiver of the same station when the relation $A = B$ holds, and thus, error detection can be carried out within a short period of time in the transmitting station. The transmitting station 1 concludes that the data transmission is successful when no errors are found in the received data which have been transmitted from the same station, and this station 1 delivers the signal $V_f$ indicative of the idle and available state of the data highway loop so as to release the common bus 7. When the station 1 transmitting the data detects errors in the received data, the station 1 delivers the signal $V_R$ and carries out retrial again starting from the step of transmission of the priority code.

When the station 1 delivering the signal $V_f$ upon completion of data transmission receives a data signal applied from another station, this specific station 1 is placed in the non-active mode 31-N and ceases to deliver the signal $V_f$. When the station 1 is not requested for data transmission and receives data from another station, the destination address in the data format is compared with the address of the station 1 in the comparator 50. When these addresses coincide with each other, the station 1 operates as a data receiving station. The station 1 is kept in the non-active mode 31-N when there is no coincidence between these addresses. In this case, the data input received by the receiver is reshaped and amplified in the station 1 to be transmitted to the next station.

When the station 1 is designated as the data receiving station, it operates in the entirely same manner as when it operates as a transmitting station, but the comparison between the priority codes is not carried out. All the data received are subjected to a complementary coincidence check and parity check, and a signal indicative of successful reception is delivered to the computer 8 when no errors are found in the data. In the reception mode 31-RE of the station 1, an AND gate 53 is in the on state and the output of the demodulator 27 is applied to the transmitter 24 through an OR gate 54, AND gate 53, OR gate 44, inhibit gate 45, OR gate 29, modulator 30 and OR gate 32 so that the received data can be returned to the transmitting station from the transmitter 24. When errors are found in the received data, all the data transmitted from the transmitter 24 are changed to the form of all 1, and returned to the transmitting station. More precisely, in response to the detection of errors by the error detector 51, the error detector 51 applies an output 51-1 to an all-1 generator 55 to trigger the same so that 1's are returned to the transmitting station through the OR gate 54 and AND gate 53. In response to the return of 1's to the transmitting station, the transmitting station detects necessarily the failure of transmission and starts retrial due to the fact that the complementary coincidence check is similarly carried out in such station too. Thus, any errors in the data occurred in the receiving station can also be detected by the transmitting station and transmission is not finished until errors in the data occurred in the receiving station are corrected. This ensures data transfer with high reliability.

An abnormal detector 56 detects abnormal conditions of the station, for example, interruption of power supply, breakdown of the receiver 22 and transmitter 24, etc. In response to the detection of such an abnormal condition, the abnormal detector 56 actuates the station bypass switches 20 and 20' so that the data input can bypass the station by way of a bypass route 57 and breakdown of anyone of the stations would not lead to shutdown of the entire data highway system.

Although the signal detecting timing, comparing timing, output delivering timing, etc., are not especially illustrated in FIG. 2, such are entirely controlled by the main controller 37.

It will be understood from the foregoing description that the present invention provides a data highway system in which a plurality of stations each including at least a receiver, a plurality of control gates (corresponding to the AND gates 28 and 33 shown in FIG. 2) and a transmitter connected in series are connected in series with one another by a single common bus to form a closed loop. In each station, an "idle" monitoring means monitors continuously as to whether the common bus is idle and available or not, and when there occurs a request for occupying the common bus under the condition in which the common bus is found idle and available, the control gates are turned off and the loop is opened to send out a priority code to the common bus for occupying the common bus. Thus, when only one station in the whole system requests to occupy the common bus, such station can transfer data to another station with any desired timing provided that the common bus is idle and available. Further, due to the fact that whether or not a specific station succeeds in occupying the common bus is determined after comparing the priority code delivered from this specific station with the priority code received from another station, any special additional bus is not required for the priority control and only one common bus suffices for this purpose. Thus, the data highway system is quite inexpensive due to the reduction in the costs of cables and wiring. Furthermore, due to the fact that any special additional hardware for the priority control is unnecessary, the reliability of the entire data highway system can be improved correspondingly.

The data highway system according to the present invention is not adversely affected by noises and conveniently meets the demand for especially high reliability due to the fact that the priority codes are compared with each other for determining the priority order. Further, by virtue of the provision of a bypass route in each station in the data highway system according to the present invention, the entire system is not in any way rendered inoperative even with breakdown of a specific station and the reliability of the data highway system can be improved. Furthermore, due to the fact that the station address is utilized as the priority code during the priority control, the priority codes can be changed or added simply as desired and flexibility is provided for a change of the priority order and additional installation of stations.

We claim:

1. A looped highway system for data transmission comprising a plurality of stations connected in series through a common bus to form a closed loop in which data transmission between apparatuses connected to the stations is carried out through the corresponding statons, wherein each of said stations includes a receiver, a transmitter and a gate control device for controlling data transmission from said receiver and to said transmitter, means for applying to said gate control device a gate control signal upon detecting whether the common bus is occupied or not for data transmission from any of the apparatuses, means for transmitting a specific priority code prdetermined for each said station through said transmitter to the common bus, said specific priority code being indicative of the priority order of each said station relative to the other stations connected in said closed loop, means for comparing the transmitted specific priority code with a priority code which is received by each said station, and means for permitting data transmission from the apparatus connected to each said station subsequently to the transmission of said specific priority code when the transmitted priority code is identical to the received priority code and the common bus is not occupied by any apparatus connected to the other stations.

2. A looped highway system as claimed in claim 1, wherein each said station further comprises means for causing said each station to operate in a wait mode where each said station is waiting for transmission of data when the received priority code indicates priority over that indicated by the transmitted specific priority code.

3. A looped highway system as claimed in claim 1, wherein each said station further comprises means for detecting the lapse of a predetermined time $T_R$ after detection of said specific priority code indicating priority over that indicated by said received priority code and means for repeating the transmission of the specific priority code from each said station to the common bus in response to the detection of said lapse of the time $T_R$ by said detecting means.

4. A looped highway system as claimed in claim 1, wherein said transmitter in each station transmits a signal having in addition to a data signal in the binary form of 1 and 0 and indicative of the data to be transmitted, a vacant signal indicative of no data signal to be transmitted.

5. A looped highway system as claimed in claim 2, wherein said transmitter in each said station transmits a signal having in addition to a data signal in the binary form of 1 and 0 and indicative of the data to be transmitted, a vacant signal indicative of no data signal to be transmitted.

6. A looped highway system as claimed in claim 3, wherein said transmitter in each said station transmits a signal having in addition to a data signal in the binary form of 1 and 0 and indicative of the data to be transmitted, a vacant signal indicative of no data signal to be transmitted.

7. A looped highway system as claimed in claim 4, including means for providing the data signal by phase modulation of a predetermined frequency and means for providing said vacant signal with a different frequency.

8. A looped highway system as claimed in claim 1, wherein each said station further comprises means for detecting the fact that the common bus is not occupied by any of the stations when each said station has detected a vacant signal which indicates that there exists no data signal to be transmitted and continues for a time longer than a predetermined time.

9. A looped highway system as claimed in claim 1, wherein each said station further comprises means for transmitting a vacant signal indicative of no data signal to be transmitted for a time less than a predetermined time to the common bus thereby initializing the other stations when the transmitted specific priority code indicates priority over that indicated by the received priority code and when some error has been found in data signal received by said each station while the common bus is occupied by each said station.

10. A looped highway system as claimed in claim 1, wherein each said station further comprises means for transmitting a vacant signal indicative of no data signal to be transmitted subsequent to the data transmission from each said station, means for comparing the duration time $T_V$ of said vacant signal with a predetermined period of time $T_{VS}$, means for initializing each said station thereby causing each said station to continue its receiving mode when the relation $T_V \leqq T_{VS}$ is established and means for releasing the common bus from occupation by each said station when the relation of $T_V > T_{VS}$ is established.

11. A looped highway system as claimed in claim 4, wherein each said station further comprises means for transmitting a vacant signal indicative of no data signal to be transmitted subsequent to the data transmission from each said station, means for comparing the duration time $T_V$ of said vacant signal with a predetermined period of time $T_{VS}$, means for initializing each said station thereby causing each said station to continue its receiving mode when the relation of $T_V \leqq T_{VS}$ is established and means for releasing the common bus from occupation by each said station when the relation of $T_V > T_{VS}$ is established.

12. A looped highway system as claimed in claim 8, wherein each said station further comprises means for transmitting a vacant signal indicative of no data signal to be transmitted subsequent to the data transmission from each said station, means for comparing the duration time $T_V$ of said vacant signal with a predetermined period of time $T_{VS}$, means for initializing each said station thereby causing each said station to continue its receiving mode when the relation of $T_V \leqq T_{VS}$ is established and means for releasing the common bus from occupation by each said station when the relation of $T_V > T_{VS}$ is established.

13. A loop type data highway system as claimed in claim 1, further comprising abnormal detecting means for detecting abnormal conditions of each said station, and a bypass route provided for each station so that, in the event of occurrence of abnormal conditions in anyone of said stations, the faulty station can be disconnected from said common bus thereby preventing the entire system from undesirable shutdown.

14. A loop type data highway system as claimed in claim 2, further comprising abnormal detecting means for detecting abnormal conditions of each said staton, and a bypass route provided for each station so that, in the event of occurrence of abnormal conditions in anyone of said stations, the faulty station can be disconnected from said common bus thereby preventing the entire system from undesirable shutdown.

15. A loop type data highway system as claimed in claim 3, further comprising abnormal detecting means for detecting abnormal conditions of each said station, and a bypass route provided for each station so that, in the event of occurrence of abnormal conditions in anyone of said stations, the faulty station can be disconnected from said common bus thereby preventing the entire system from undesirable shutdown.

16. A loop type data highway system as claimed in claim 1, further comprising means for providing a transmission format consisting of a train of normal and inverted codes, means for continuously carrying out a complementary coincidence check on such a transmission format in the receiving station, and all-1 signal generating means so that, when received data are normal, such data are returned intact to the transmitting station, while when the received data are abnormal, an all-1 signal is returned to the transmitting station.

17. A loop type data highway system as claimed in claim 2, further comprising means for providing a transmission format consisting of a train of normal and inverted codes, means for continuously carrying out a complementary coincidence check on such a transmission format in the receiving station, and all-1 signal generating means so that, when received data are normal, such data are returned intact to the transmitting station, while when the received data are abnormal, an all-1 signal is returned to the transmitting station.

18. A loop type data highway system as claimed in claim 3, further comprising means for providing a transmission format consisting of a train of normal and inverted codes, means for continuously carrying out a complementary coincidence check on such a transmission format in the receiving station, and all-1 signal generating means so that, when received data are normal, such data are returned intact to the transmitting station, while when the received data are abnormal an all-1 signal is returned to the transmitting station.

* * * * *